United States Patent [19]
Lambert

[11] 3,816,075

[45] June 11, 1974

[54] DETERMINATION OF HYPOPHOSPHITE ION CONCENTRATION

[75] Inventor: Maurice C. Lambert, Richland, Wash.

[73] Assignee: The United States of America as represented by the United States Atomic Energy Commission, Washington, D.C.

[22] Filed: Nov. 28, 1972

[21] Appl. No.: 310,177

[52] U.S. Cl........... 23/230 R, 23/230 A, 117/130 E
[51] Int. Cl. ........................................... G01n 31/22
[58] Field of Search....... 23/230 R, 230 A; 252/408; 117/130 E

[56] References Cited
UNITED STATES PATENTS
2,697,651 12/1954 Gutzeit.............................. 23/230 R
3,425,805 2/1969 Grobin, Jr......................... 23/230 R OTHER PUBLICATIONS
Goswami A.; Nickel Deposition by Chemical Reduction, A Rapid Method of Estimation of Hypophosphite [in plating baths]; J. Indian Chem. Soc., Ind. Ed., 1955, 18(2), 116–117.

Primary Examiner—Joseph Scovronek
Assistant Examiner—Dale Lovercheck
Attorney, Agent, or Firm—John A. Horan; Arthur A. Churm; Hugh W. Glenn

[57] ABSTRACT

A sample solution containing hypophosphite and phosphite ions is acidified a sufficient amount to convert most of the phosphite ions to an unreactive form. A solution of ferric ions is combined with the sample and the mixture heated to oxidize the hypophosphite while reducing the ferric to ferrous ions. A complexing agent and a pH buffer are included in the mixture to produce a red colored ferrous complex from which the original concentration of the hypophosphite ion is photometrically determined.

10 Claims, 2 Drawing Figures

DETERMINATION OF HYPOPHOSPHITE ION CONCENTRATION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to a rapid method for the photometric determination of hypophosphite ions. The method is of particular value in the control of chemical or electroless plating solutions for nickel metal. The hypophosphite ion is employed as a reductant to plate nickel metal from solution. Therefore, the concentration of this reductant bears on the rate of deposition, the proportion of phosphorus in the deposit and other properties of the resulting nickel plating. Consequently, it is most important to monitor and control the amount of the hypophosphite ion within the plating bath.

The quantitative determination of hypophosphite is ordinarily based on a method requiring its oxidation. In most plating solutions the phosphite ion will also be present as one product of the electroless plating process and since it will oxidize nearly as readily as hypophosphite, the determination of the latter may be subject to error. Present methods for determining hypophosphite often use a sufficiently weak oxidizing agent to differentiate between the two phosphorus species, but the analysis requires several hours to complete. Further, lag between the actual concentration of hypophosphite in the bath and that determined may also occur when samples are only periodically taken by a technician for subsequent analysis.

SUMMARY OF THE INVENTION

Therefore, it is an object of the present invention to provide an accurate method for measuring the hypophosphite ion concentration in a solution containing phosphite ions.

It is also an object to provide such a method which can be accomplished within a reasonably short time interval.

It is a further object to provide a continuous method of monitoring hypophosphite ion concentration within a bath for the electroless plating of nickel metal.

In accordance with the present invention, the acidity of a sample solution is adjusted to a pH of less than 1 whereby substantially all of the phosphite ion is converted to a more acid form that is not oxidized appreciably. An effective amount of ferric ions and a chemical complexing agent are added to the sample to oxidize a major portion of the hypophosphite ions and to form a colored complex with the resulting ferrous ions. By colorimetrically or photometrically determining the concentration of the ferrous ion complex, the original concentration of the hypophosphite is found.

DESCRIPTION OF THE DRAWINGS

The present invention is illustrated in the accompanying drawings wherein.

DETAILED DESCRIPTION

Figure 1:
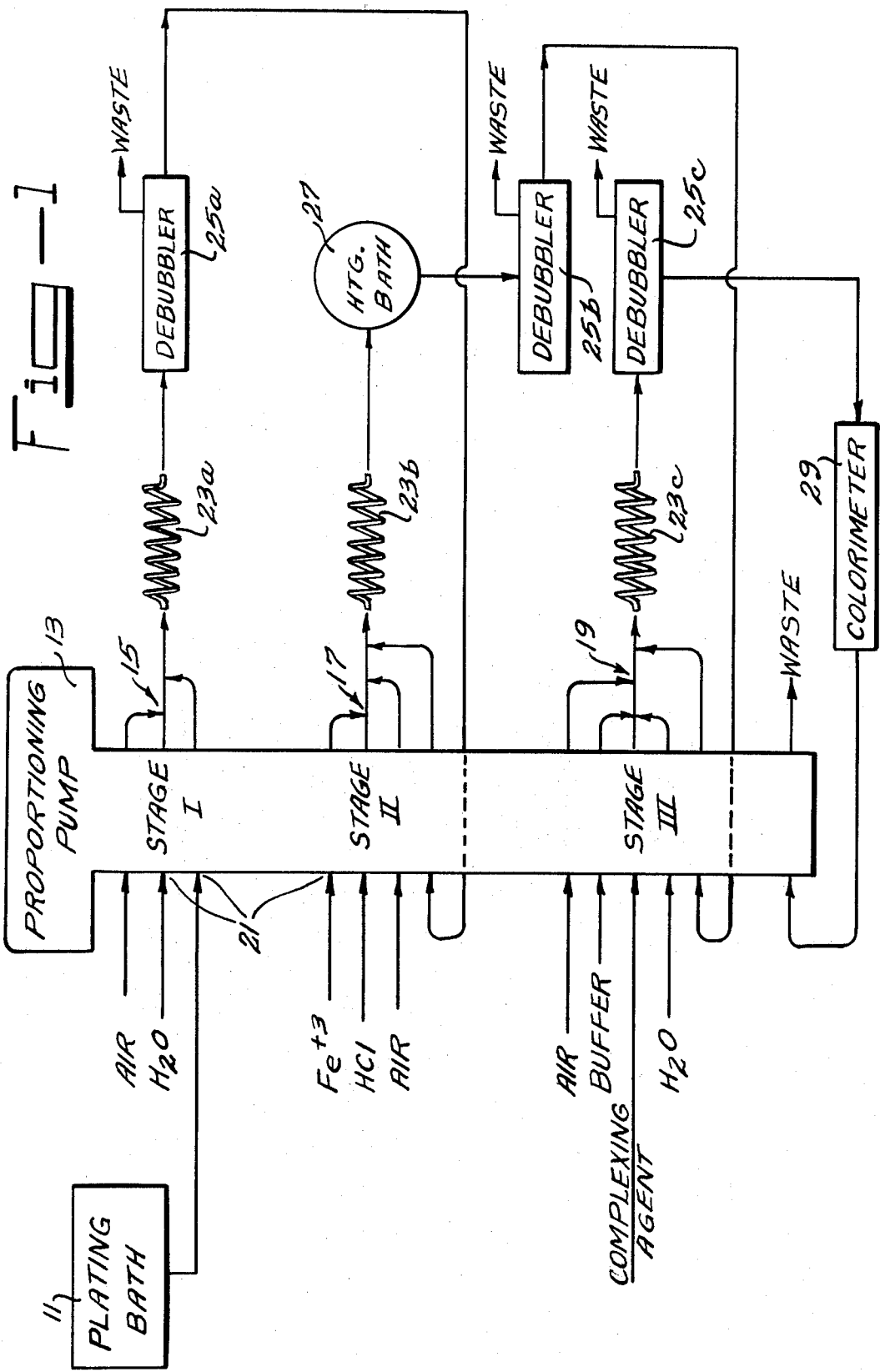
FIG. 1 is a schematic flow diagram of a continuous hypophosphite determination system.

Turning now to FIG. 1, a system for continuously analyzing samples of solution from a plating bath 11 is shown. The plating bath solution is typically used in the electroless plating of nickel metal and contains hypophosphite ions for chemical reduction of the nickel. On oxidation, as part of the plating reaction, hypophosphite is converted to phosphite and other phosphorus species of a higher oxidation state. It is the phosphite ion which ordinarily interferes with the analytical determination of hypophosphite by oxidation techniques.

The present process employs a multiple-stage proportioning pump 13 and other commercially-available, automated equipment illustrated in FIG. 1 for successively blending the sample solution with various reagents and diluents. Although a plurality of separate pumps could be used for these functions, the multiple-stage pump system is preferred to maximize the precision of sample dilution and reagent addition.

Since suitable proportioning pumps are commercially available, the details of the pump's operation are not shown in the drawing. A typical pump includes a plurality of resilient but flattenable plastic tubes arranged in a parallel array. A number of metal rollers mounted on an endless chain repetitively flatten the tubes against a platform surface to discharge or pump the fluid from within each tube into one of several manifold junctions illustrated at 15, 17 and 19. The rollers traveling along the individual tubes can be programmed to discharge fluid simultaneously from all or some of the tubes, or alternatively to sequentially pump from the various tubes in the array as desired. Each tube has an individual inlet, as at 21, for separately admitting a particular fluid into the portion disposed beneath the path of the metal rollers. The relative diameters of the tubes are selected to obtain the correct proportioning of the fluids being pumped. Each stage of the proportioning pump is followed by a horizontal coil of tubing respectively referenced as 23a, 23b and 23c for allowing the fluids to thoroughly intermix prior to the next stage. Debubblers 25a, 25b and 25c are also provided in the fluid flow for removing air before the liquid proceeds to the next stage. The debubblers can be an enlarged section or vessel within the tubing with a vent outlet towards the top for removing gas and excess liquid. The remaining liquid flows out the bottom towards the suction of the next pump stage.

Each stage of the proportioning

Other components of the system include a heating bath 27 and a colorimeter 29. The heating bath is of conventional construction with a tubing coil for the solution flow passing through an oil-filled container having a thermostatically controlled heating unit.

The colorimeter is a commercially available instrument having dual monochromatic light beams and detectors. One beam is transmitted through the sample solution while the other is either unimpeded or else passes through a reference solution or filter. In the present invention it is desirable to employ light beams having a wavelength of 510 nm ($10^{-9}$ meter). This corresponds to an absorption peak in the spectrum of the ferrous phenanthroline complex which is produced as described below.

In one manner of operating the system of FIG. 1, a sample solution from a nickel-plating bath 11 is admitted into one of the tubes constituting the first stage of the proportioning pump 13. A flow of water and of air are respectively introduced in two other first stage tubes. In junction 15 as well as the other junctions 17 and 19, the sample or the solution from the previous stage is introduced through the last arm downstream. The air stream is intermittently added immediately above the sample to divide the water or other solution flow into discrete liquid portions. The sample or the previous stage solution flow is then injected into each of the discrete liquid portions. The air bubbles sweep the tube walls behind each liquid portion to sharply contrast sample concentration changes and to decrease wash time.

The water added in the first and subsequent stages dilutes the sample to an appropriately low concentration for the subsequent photometric analysis. A plating solution will typically contain about 1 to 12 grams per liter of sodium hypophosphite as $NaH_2PO_2 \cdot H_2O$. Such concentrations will ordinarily require a volumetric dilution factor of about 1,000 prior to photometrically determining hypophosphite. Increased accuracy is obtained by performing the dilution in the several stages as shown, to limit the dilution factor to no more than about 12 in each stage. The use of multiple stages also reduces the amount and therefore the cost of reagents, since they can be added in the latter stages after at least part of the required dilution has been completed.

The diluted solution is thoroughly blended in each stage within the mixing coils 23a, 23b and 23c as the heavier solutions are made to repetitively fall through the less dense liquids. After blending, the air and solution are separated in the debubblers 25a, 25b and 25c and a small fraction of the solution passed on to the next stage of the proportioning pump 13. The air flow is vented and the remaining major fraction of the solution sent to waste.

Following the second stage of the proportioning pump 13, the diluted sample solution is combined with a dilute acid and a solution of ferric ions. It is particularly important that the sample solution be introduced last in this stage to allow the acid to react with the phosphite ions prior to any substantial oxidation.

A number of acids, for instance, hydrochloric, nitric, sulfuric and phosphoric acids have been tried, but it has been found that the oxidation of hypophosphite by ferric ions occurs faster in hydrochloric acid. Furthermore, hydrochloric acid does not oxidize other plating solution ingredients. It has also been found that increased acid concentrations impede both the phosphite and hypophosphite oxidations; however, hydrochloric acid concentrations that provide a pH of less than 1, particularly of about 0.3 to 0.8 mole per liter selectively allow hypophosphite oxidation in the presence of phosphite ions. The optimum concentration for this purpose has been found to be about 0.5 mole per liter of hydrochloric acid. Acid concentrations in these amounts convert the phosphite ions to the less reactive diacid phosphite ($^-H_2PO_3$) and phosphorus acid ($H_3PO_3$).

The ferric ions are added as a dissolved salt. One suitable soluble salt is ferric ammonium sulfate, $Fe_2(SO_4)_3(NH_4)_2SO_4 \cdot 24 H_2O$. Ordinarily, two ferric ions will be used in oxidizing each hypophosphite. An effective amount of ferric ions has been found to be about three to six times the stoichiometric amount needed to react with the expected hypophosphite ion concentration. However, due to diminishing returns in increased oxidation, about five times the stoichiometric amount is preferred.

Within the second stage junction 17, air is again intermittently injected into the solution flow and then the solution ingredients are mixed in the blending coil 23b. The sample mixture is thereafter passed through the heating bath 27 where it is heated to a temperature of about 90°C., that is 80°C. to 100°C., to oxidize the hypophosphite in solution. Higher temperatures might also be used if the system is pressurized to prevent vapor production from prematurely forcing the liquid through the heating bath. The tubing coil containing the sample mixture within the heating bath is of sufficient length and volume to maintain the mixture at the desired temperature for more than about 5 minutes. Generally no more than about 10 minutes heating time will be required to oxidize a major and reproducible portion of the hypophosphite and thereby permit its consistent determination. The oxidation reaction also reduces the ferric ion to the ferrous ion which can subsequently be complexed and colorimetrically determined.

A steady-state condition can be achieved in the sample mixture as it passes through the heating bath by carefully controlling the heating media temperature and the mixture flow rate at constant levels. Reproducible results can thereby be obtained although somewhat less than 100 percent of the hypophosphite is oxidized. This is in contrast to batch analytical processes in which heating temperature and time are not so reproducible, and consequently, reproducible results require near complete oxidation with correspondingly increased heating time.

Typical oxidation times and temperatures for the process illustrated in FIG. 1 are given below in Table I. The data in this table are compiled from the oxidation of a solution at 0.5 M HCl and having an original hypophosphite solution of about 10.6 grams per liter (0.1 molar) diluted by a factor of about 77 at this point in the process. About 5 moles of ferric ammonium sulfate are added for each mole of hypophosphite present to provide a 5 to 1 stoichiometric ratio.

Table I

| Heating Bath Temp. °C. | Heating Time Min:Sec | Avg. Per Cent Oxidation |
|---|---|---|
| 95 | 5:20 | 83.5 |
| 90 | 7:35 | 79.0 |
| 85 | 9:10 | 67.7 |

It can be seen from Table I that the majority of hypophosphite ions can be readily oxidized at the time and temperatures given above.

A small fraction of the solution leaving heating bath 27 is withdrawn from debubbler 25b and passed on to the third stage where it is combined with a complexing agent and a buffering solution. A particularly suitable complexing agent that produces a detectable red color on combining with the ferrous ion even in very dilute solutions is ortho-phenanthroline:

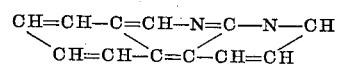

Three molecules of phenanthroline combine with each ferrous ion to form the complex. An aqueous solution of the reagent is prepared by dissolving it in warm water along with about 1 ml of HCl per liter of solution. An about 0.01 mole per liter of phenanthroline in the stock solution is sufficient to conveniently supply between 1.5 and 2 times the stoichiometric amount required to react with the ferrous ions produced. In view of its high cost, an optimum amount has been found to be between about 1.6 and 1.7 of the above stoichiometric amount.

The color of the ferrous phenanthroline complex appears promptly if the pH is maintained at an increased level at this point in the process. As shown, a buffer solution is proportioned into the sample mixture in the junction 19 following the third pump stage. A number of suitable buffering agents could be employed; one in particular is ammonium acetate, $NH_4C_2H_3O_2$. In conjunction with the water added into the third stage of the proportioning pump, a final mixture having a pH of about $4.8 \pm 0.3$ can be thus prepared and a fraction of it passed into colorimeter 29.

The total dilution at this point in the process of the original sample taken from plating bath 11 will typically be about 1,000 to 1. Examples of three dilution schemes along with typical flow rates and reagent concentrations are given below in Table II.

Figure 2:
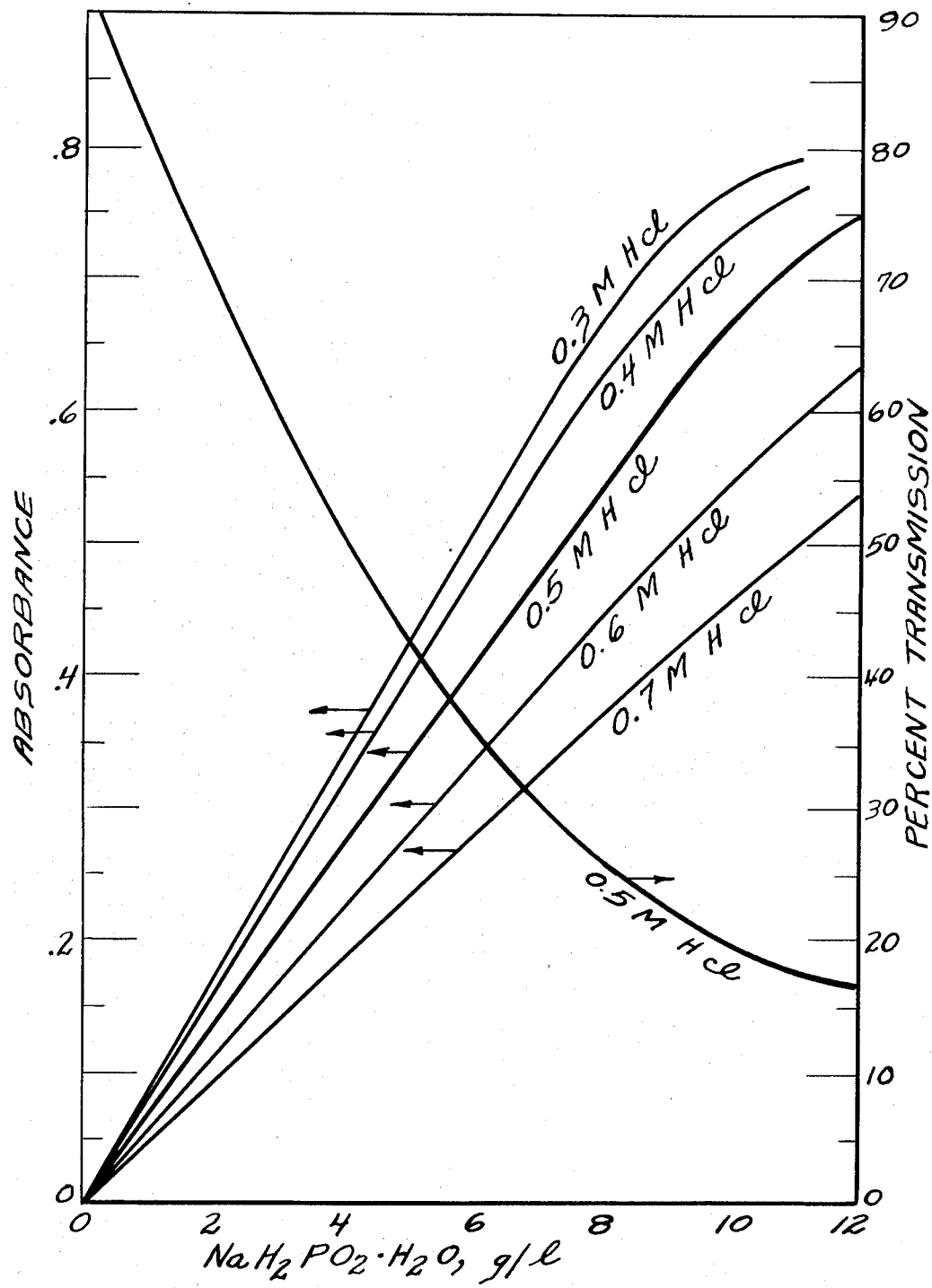
FIG. 2 is a graph showing typical calibration curves for the system of FIG. 1.

As can be seen, the relationship of concentration to per cent transmission is not proportional. Also presented in FIG. 2, however, is a family of curves corresponding to 0.3 M to 0.7 M HCl during the oxidation portion of the process. These curves relate absorbance to concentration of sodium hypophosphite. Absorbance, as defined by the Lambert-Beer law, is given as follows (see Daniels and Alberty, *Pical Chemistry*, p. 521, 2d Ed. 1961, John Wiley & Sons, Inc.):

$$\log I_o/I = A = abc$$

where:
$I_o$ — reference light intensity
$I$ — intensity of light transmitted through the sample
$A$ — absorbance
$a$ — extinction coefficient
$b$ — path length
$c$ — concentration As shown in FIG. 2, in 0.5 M HCl the absorbance below about 0.7 with a 4 mm path length is linearly proportional to the concentration of hypophosphite as is predicted by the Beer-Lambert law. Sodium hypophosphite concentrations which give absorbance values beyond the linear region of the curves cannot be as accurately determined because the slope of the curve decreases. Therefore, more concentrated solutions of hypophosphite are accurately analyzed by resorting to

TABLE II

Typical Sample Dilutions

| Stage I | | | Stage II (Oxidation) | | | |
|---|---|---|---|---|---|---|
| Plating Bath, ml/min. | Water, ml/min. | Dilution Factor | Mix. I, ml/min. | 1.1 M HCl, ml/min. | 0.034 N $Fe^{+3}$, ml/min. | Dilution Factor |
| 0.32 | 2.90 | 10.063 | 0.32 | 1.20 | 1.20 | 8.500 |
| 0.32 | 3.40 | 11.625 | 0.32 | 1.00 | 0.80 | 6.625 |
| 0.32 | 3.40 | 11.625 | 0.32 | 1.00 | 0.80 | 6.625 |

| Stage III (Color Formation) | | | | | |
|---|---|---|---|---|---|
| Mix. II, ml/min. Factor | 0.01 M O-Phen., ml/min. | 0.5 M $NH_4C_2H_3O_2$, ml/min. | Water, ml/min. | Dilution Factor | Total Dilution |
| 0.32 | 1.60 | 1.60 | 0 | 11.00 | 941 |
| 0.32 | 2.00 | 2.00 | 0 | 13.50 | 1040 |
| 0.32 | 0.42 | 1.00 | 2.50 | 13.25 | 1020 |

It can be seen from Table II that, by using dilute reagent solutions and by spreading the total dilution over three stages, large dilution factors can be obtained without having to interblend very large and very small flows. Consequently, the required dilution can be accurately and reproducibly performed.

In the double-beam colorimeter 29, one beam of monochromatic light at 510 nm wavelength is passed through a 4 mm path length photometric cell through which the diluted sample solution flows. The intensity of transmitted light is detected and compared with the intensity of a reference beam of light.

In FIG. 2, a calibration curve for 0.5 mole per liter HCl during the oxidation step at 90°C. and about 7 minutes heating time is shown relating the per cent light transmission through the sample solution to the original concentration of sodium hypophosphite. The actual concentration of hypophosphite read in the colorimeter is diluted a volumetric factor of about 1,000.

greater over-all dilution. Alternatively, a reference solution having a known concentration of the ferrous phenanthroline complex, or even a colored glass filter having the desired absorbance, can be positioned in the reference beam. The light transmitted through the reference solution or filter is substituted for $I_o$ in Equation 1 above to move the sample reading back into the linear region of the absorbance versus concentration curve of FIG. 2.

In performing the present method, various other modifications can be made as required to meet particular conditions. For instance, where oxidation temperatures below about 90°C. are used, a catalyst added prior to the oxidation step may be desirable in order to accelerate the oxidation reaction. Very low concentrations of thallium ions, for instance about 0.0002 M, are found to be suitable for this purpose.

It can be seen that the present invention provides an accurate method of analyzing the hypophosphite concentration in an electrolysis plating bath for nickel metal. The method permits the determination to be made in the presence of phosphite ions without resorting to extremely weak oxidizing agents which require long intervals to react with all or most of the hypophosphite ion concentration. As described, the method can be continuously performed to allow constant monitoring of the plating bath solution. Moreover, continuous automated sampling allows the heating and oxidation portion of the process to reach a steady state such that reproducible results can be rapidly obtained at somewhat less than complete oxidation.

I claim:

1. A rapid method of determining the concentration of hypophosphite ions in a sample solution also containing phosphite ions comprising:
   A. adjusting the acidity of said solution to a pH of less than 1 and thereby converting substantially all of said phosphite ions to unreactive form;
   B. adding an effective amount of ferric ions and subsequently heating said sample solution to oxidize a major portion of said hypophosphite ions by the reduction of said ferric to ferrous ions;
   C. photometrically determining the concentration of said ferrous ions and thereby determining the concentration of said hypophosphite ions 2. The method of claim 1 wherein a flow of sample solution is diluted by a volumetric factor of about 10 to 12 to form a first diluted solution flow, a fraction of said first diluted solution flow is separated and further diluted to a volumetric factor of about 70 to 80 per original part of solution prior to said heating step to form a second diluted solution flow, and a fraction of said second diluted solution flow is separated subsequent to said heating step and diluted to a volumetric factor of about 900 to 1,100 per original part of solution prior to photometrically determining the concentration of said ferrous ions.

3. The method of claim 2 wherein said second diluted solution flow is prepared with a hydrogen ion concentration of about 0.3 to 0.8 mole per liter by combining flows of hydrochloric acid and ferric ion solutions and subsequently intermixing the combined flow with the separated fraction of said first diluted sample solution flow.

4. The method of claim 1 wherein said ferrous ions are photometrically determined by adding a chemical complexing reagent to form a ferrous ion complex having a known peak of light absorbance at a particular wavelength and thereafter measuring the light absorbance within said solution at said wavelength.

5. The method of claim 4 wherein said complexing reagent is ortho-phenanthroline.

6. The method of claim 5 wherein said photometric determination is performed while maintaining said solution with ortho-phenanthroline at a pH of about 4.8.

7. The method of claim 5 wherein said photometric determination is performed by measuring the absorbance of a monochromatic light beam having a wavelength of about 510 nm.

8. The method of claim 1 wherein said ferric ions are added in a stoichiometric ratio of about 5 to 1 in respect to said hypophosphite ion concentration.

9. The method of claim 1 wherein said solution is heated to a temperature of about 90°C. and maintained at said temperature for about 5 to 10 minutes during the oxidation of said hypophosphite ions.

10. The method of claim 1 wherein thallium ions are added to said solution prior to said heating step to catalyze said oxidation of hypophosphite ions.

* * * * *